United States Patent [19]

Minayoshi

[11] Patent Number: 5,288,784
[45] Date of Patent: Feb. 22, 1994

[54] POLYESTER COMPOSITION CONTAINING VATERITE-TYPE CALCIUM CARBONATE

[75] Inventor: Shiro Minayoshi, Akashi, Japan

[73] Assignee: Maruo Calcium Company Limited, Akashi, Japan

[21] Appl. No.: 705,423

[22] Filed: May 24, 1991

[30] Foreign Application Priority Data

May 28, 1990 [JP] Japan .................................. 2-137486

[51] Int. Cl.$^5$ ............................ C08J 3/20; C09C 1/02
[52] U.S. Cl. .................................... 524/425; 524/430; 523/514
[58] Field of Search .................. 524/425, 430; 523/514

[56] References Cited

U.S. PATENT DOCUMENTS

| | | | |
|---|---|---|---|
| 4,693,932 | 9/1987 | Kuze et al. | 524/425 |
| 4,857,291 | 8/1989 | Ota et al. | 106/464 |
| 5,164,439 | 11/1992 | Sakamoto et al. | 524/425 |

FOREIGN PATENT DOCUMENTS

| | | | |
|---|---|---|---|
| 0296610 | 12/1988 | European Pat. Off. | 524/425 |
| 61004920 | 8/1981 | Japan | 523/514 |
| 01027718 | 7/1983 | Japan | 523/514 |
| 2077923 | 4/1987 | Japan | 524/425 |

*Primary Examiner*—Paul R. Michl
*Assistant Examiner*—Olga Asinovsky
*Attorney, Agent, or Firm*—Armstrong, Westerman, Hattori, McLeland & Naughton

[57] ABSTRACT

A polyester composition is disclosed, which is characterized in that it contains, besides polyester, vaterite-type calcium carbonate obtainable through carbonation reaction of a calcium compound in a mixed medium of alcohol and water. The polyester composition is superior in compatibility between the polyester and the vaterite-type calcium carbonate.

2 Claims, 2 Drawing Sheets

POLYESTER COMPOSITION CONTAINING VATERITE-TYPE CALCIUM CARBONATE

BACKGROUND OF THE INVENTION

1. Field of the Invention

The present invention relates to a polyester composition and, more particularly, to a polyester composition containing a vaterite-type calcium carbonate prepared by a special method, excelled in slipperiness as well as wear resistance and less in the count of coarse projections.

2. Description of the Prior Art

Today, industrially manufactured polyester, especially polyethylene telephthalate (hereinafter referred to as "PET"), is excelled in both physical and chemical properties and is widely in use as fiber, film and other molded articles. In the field of films, for example, it is used in the manufacture of magnetic tape such as audio tape and video tape, for capacitor uses, photographic uses, and packaging and OHP-related uses.

In the field of polyester film, the workability in film-making steps and in processing steps in other uses depends largely on its slipperiness and anti-shaving property, this, in turn, determining the quality of products. In case the slipperiness and/or anti-shaving property are insufficient and when, for example, the surface of polyester film is coated with a magnetic material for manufacture of magnetic tape, friction between the coating roll and the film surface is markedly high as well as the wear of the film surface and, in extreme cases, creases and abrasions are caused to be formed in the film surface. And even after slitting the film coated with the magnetic material, marked friction is caused between many guide parts, playback heads et cetera, this causing separation of chalk-like substance resulting from abrasion, generation of strain, shaving of polyester film surface, and it often results in missing of magnetic recording signals, so-called drop-out.

Hitherto, many methods have been proposed for lowering the friction coefficient of polyester such as incorporating fine particles into polyester to impart a fine and proper degree of roughness to the surface of a molded article but none of them were satisfactory in film's transparency and wear resistance due to insufficient compatibility between such fine particles and polyester. To further explain the method, a large number of methods have hitherto been proposed represented by:

(1) a method in which a part or whole of catalyst et cetera used in polyester synthesis are separated in the reaction process (inner particles separation method), and (2) a method in which fine particles of calcium carbonate, silicium dioxide and the like are added during polymerization or thereafter (outer particles adding method).

With such particles imparting surface roughness to polyester film, the slipperiness-improving effect attainable is generally larger with increasing size thereof. In precision uses such as magnetic tape and video tape, in particular, however, the increased size of such particles itself can cause defects such as drop-out, hence the surface roughness of film is required to be as small or fine as possible, and required is satisfaction of these contradictory requirements simultaneously.

In the inner particles separation method (1), in which the particles in question are of a metallic salt of polyester component or the like, the compatibility with polyester is relatively good, but it is difficult to control the quantity of particles added and the particle size as well as to prevent formation of coarse particles.

Meanwhile, in the method (2), the slipperiness attainable can be improved by adding fine particles properly selected in particle size and with coarse particles removed by classification and the like and properly controlling the quantity thereof. Since, the compatibility between inorganic fine particles and polyester as organic component is insufficient, however, separation takes place in the boundary between particles and polyester, this giving rise to formation of voids. If such voids should exists in polyester, elimination of particles from polyester film is likely to be caused by contact between polyester films or between polyester film and other media and resultant damage of polyester film or the like, this resulting in, for instance, chalking of the film for magnetic tapes and the aforementioned phenomenon of drop-out. Also, large gaps are bound to exist around the individual particles, this interfering with transparency of polyester film. Hence, the lack of compatibility between inorganic particles and polyester is a problem to be solved for improvement of wear resistance and transparency.

For improvement of compatibility between inorganic particles and polyester proposed is coupling reaction between silane type compound or titanate type compound and inorganic compound, but there have been noted various problems such as complicatedness of the treating process and the effect attainable not so good as expected. Also, for improvement of dispersibility of such inorganic compounds in polyester there has been taken a method of preparing glycol slurry of fine particles of the inorganic compounds and adding it in the course of polyester manufacture. Such inorganic compounds, however, have such defects as being hardly good in dispersibility or and in dispersion stability, being subject to precipitation and deposition and tending to form a hard cake which is hardly redispersible, when glycol with inorganic compounds suspended therein is stored over a long period, and further tending to agglomerate in glycol or in the course of polyester manufacture. The existence of agglomerated coarse particles in polymer causes breaking of yarn during spinning, formation of large projections in film or of fish eyes. Especially when it is used as film for magnetic tape, it gives rise to drop-outs or lowering of S/N ratio, hence development of microparticles without formation of agglomerated coarse particles is awaited.

As one of inorganic compounds used in these outer particles adding methods, monodisperse spherical silica obtainable by hydrolysis, condensation or the like of alcoxysilane is developed and its possibility as anti-blocking agent for video-tape required to have a high degree of quality has been studied.

The aforementioned spherical silica is, however, difficult to prepare economically for the price of alcoxysilane as its material being extremely high and also a long time is required for reaction due to slow progress of hydrolysis and, also, the compatibility of polyester is insufficient compared with those of other inorganic particles added externally to polyester, the aforementioned spherical silica is apt to release from polyester film due to damage of polyester film, this possibly causing chalking or drop-out of film for magnetic tape. Further, since the aforementioned silica is extremely high in Mohs hardness, being 6 or more, there is a large defect of the spherical silica released from polyester film injuring the surface of the reproduction head of the video tape recorder. In this respect, the Mohs hardness of calcium carbonate is approximately 3, this being relatively low among inorganic particles in general. Hence, development of calcium carbonate, same as or better than the aforementioned silica in uniformity and dispersibility and improved in compatibility with polyester has been expected.

Of those fine particles used in polyester manufacture, calcium carbonate, whose material, limestone, yields abundantly in Japan, is being widely used as filler in many fields such as manufacture of paper, paint, rubber and plastic. This calcium carbonate is generally divided into two major categories of heavy calcium carbonate and precipitated calcium carbonate (synthetic calcium carbonate).

Heavy calcium carbonate is calcium carbonate prepared in various grades by classification of mechanically ground limestone, which has a feature of being relatively low in manufacturing cost but broad in particle size distribution and has a defect that by the current grinding-classification technique calcium carbonate higher than a given degree of fineness is unattainable.

Meanwhile, precipitated calcium carbonate is a synthetic calcium carbonate prepared by a chemical method such as carbon dioxide gas carbonation process in which unslaked lime obtained by calcinating limestone at a high temperature is caused to react with water to prepare milk of lime and then letting carbon dioxide gas resulting from calcination of limestone through the milk of lime, lime soda process in which milk of lime is caused to react with sodium carbonate and soda process in which calcium chloride is caused to react with sodium carbonate. Compared with the heavy calcium carbonate obtained by mechanically grinding limestone, this kind of calcium carbonate has a uniform form of primary particle and a relatively good dispersibility. The primary particle form and primary particle size or diameter of precipitated calcium carbonate are arbitrarily selectable by selection of the carbonation conditions such as concentration, temperature, pH, reaction time, and kinds or quantities of additives. The precipitated calcium carbonate, however, tends to have its primary particles cohere or agglomerate to form secondary particles (agglomerates of primary particles) and, therefore, has a defect of being unable to prepare without formation of secondary particles by any conventional carbonation method unless proper mechanical aftertreatment such as wet-grinding by the use of a wet grinder.

These kinds of calcium carbonate are preferably used, for they are relatively low in hardness compared with other fine particles used in manufacture of polyester, and the following methods have hitherto been often used.

(1) A method of repeatedly classifying pneumatically heavy calcium carbonate as it is or with its surface treated with fatty acid, resin acid or one of alkaline metal salts thereof for elimination of coarse particles about 5 $\mu$m or more in particle size, this followed by dispersion in glycol before use.

(2) A method of dispersing heavy calcium carbonate in glycol and wet-grinding it by the use of a wet grinder such as a sand mill, this followed by wet classification for elimination of coarse particles about 3 $\mu$m or more in particle size before use.

(3) A method of dispersing precipitated calcium carbonate having a specific level of dispersibility and having its particle size in a specific range, this followed by wet-grinding under specific conditions before use.

For use in polyester, however, calcium carbonate prepared by the aforementioned method (1), (2) or (3) has the following fatal defect.

In case of the method (1);

(a) Even if a commercially available fine grade of heavy calcium carbonate is selected for pneumatic classification, the particle size distribution of such heavy calcium carbonate is broad allowing existence of coarse particles 4–6 $\mu$m in size. And perfect elimination of coarse particles up to about 3 $\mu$m in size is difficult even by repeated classification by the use of a high-level pneumatic classifier. Hence, heavy calcium carbonate prepared by this method is difficult to use in the manufacture of extremely thin polyester film used as material of audio tapes et cetera.

(b) When heavy calcium carbonate surface-treated with fatty acid, resin acid or one of alkaline metals thereof for improvement of classification efficiency of pneumatic classification, the dispersion stability in glycol is deteriorated due to the poor compatibility of such surface treating agent with glycol.

(c) The fineness of heavy calcium carbonate for pneumatic classification is limited, hence preparation of calcium carbonate with its particle size in a given range is infeasible.

In case of (2);

(a) Since in this method heavy calcium carbonate as material is ground by the use of a wet grinder, calcium carbonate with its mean particle size in a given range is feasible with a relative ease compared with the method (1). Wet grinding, however, gives cause for formation of a large amount of fine particles unnecessarily small in size, this resulting in a broad particle size distribution and undesirable decrease of the absolute quantity of calcium carbonate contributing to the desired improvement of friction behavior of polyester film. Worse, such ultra-fine particles re-agglomerate in glycol to form coarse secondary particles, which often deteriorate the physical properties of polyester films or fibers.

(b) Even when heavy calcium carbonate as material is wet-ground by the use of a wet grinder, it is possible that coarse particles 4–6 $\mu$m in size are contained in the ground calcium carbonate by the phenomenon called "short pass" (a phenomenon in which coarse particles in the material to be ground are discharged from a wet grinder almost intact) and, even if attempt is made for elimination of such coarse particles by a wet centrifugal classifier, the size of particles economically eliminatable by classification is about 1 $\mu$m. Hence calcium carbonate prepared by this method is not usable for polyester films intended for specific uses requiring perfect elimination of particles 1 $\mu$m or more in size, for example, 8 mm video tape.

In case of (3);

Since in this method precipitated calcium carbonate used as material has dispersibility higher than a specific level in particle size and degree of dispersion and wet-grinding is carried out under specific grinding conditions, the quantities of coarse particles and unnecessarily fine particles are definitely less than in cases (1) and (2) and calcium carbonate relatively uniform in particle size and sharp in distribution of projections in film surface is obtainable. Even by this method, however, it is difficult to prepare calcium carbonate with no coarse particle about 1 μm in size and to date the final finishing step by centrifugal classification, screening or the like has been taken as indispensable. Further, with the wet-grinder indispensable for the process, partial damage of the grinding media such as glass beads is inevitable, this resulting in undesirous incorporation of traces of broken media 10–30 μm in particle size.

SUMMARY OF THE INVENTION

It is an object of the present invention to provide a polyester composition comprising polyester and vaterite-type calcium carbonate prepared by the special method, having extremely excellent compatibility between the two.

Other objects and advantages of the present invention will be apparent from the detailed disclosure that follows.

In view of the aforementioned situation, the present inventors made intensive studies about the inorganic particles to be added externally to polyester for preparation of polyester compositions excelled in slidability, anti-shaving property et cetera, favorable in the shape, dimensions, distribution et cetera of surface projections and having properties suited for various uses, calcium carbonate especially low in Mohs hardness, and discovered that a polyester composition prepared with incorporation of vaterite-type calcium carbonate obtained by a specific preparation method has an extremely favorable compatibility between vaterite-type calcium carbonate and polyester, and succeeded in completion of the polyester composition of the present invention.

DETAILED DESCRIPTION OF THE INVENTION

Thus, the present invention relates to a polyester composition featuring that it contains vaterite-type calcium carbonate obtained by carbonation of a calcium compound in a mixed medium of alcohol and water.

Polyester of the present invention comprises an aromatic dicarboxylic acid as the primary acid component and an aliphatic glycol as the primary glycol component. Such polyester is substantially linear and has film forming property, especially that by melt extrusion. As aromatic dicarboxylic acids may be included, for example, telephthalic acid, naphthalene dicarboxylic acid, isophthalic acid, diphenyl ethane dicarboxylic acid, diphenyl dicarboxylic acid, diphenyl ether dicarboxylic acid, diphenyl sulfone dicarboxylic acid, diphenyl ketone dicarboxylic acid and anthracene dicarboxylic acid. As aliphatic glycols may be included, for example, ethylene glycol, polymethylene glycols of 2–10 in carbon number such as trimethylene glycol, tetramethylene glycol, pentamethylene glycol, hexamethylene glycol and decamethylene glycol, alicyclic diols such as cyclohexane dimethanol. As polyesters referred to in the method of the present invention, those with alkylene telephthalate and/or alkylene naphthalate as principal structural component are preferably used. Of such polyesters, preferred are copolymers, for example, with not less than 80 mol % of the entire dicarboxylic acid component accounted for by telephthalic acid and/or 2,6-naphthalene-dicarboxylic acid and not less than 80 mol % of the entire glycol component accounted for by ethylene glycol, to say nothing of polyethylene telephthalate, polyethylene-2 and 6-naphthalate. Not more than 20 mol % of the entire acid component may be accounted for by some of the aforementioned aromatic dicarboxylic acids except telephthalic acid and/or naphthalene dicarboxylic acid or by, for example, aliphatic dicarboxylic acid such as adipic acid and sebacic acid, alicyclic dicarboxylic acids such as cyclohexane-1, 4-dicarboxylic acid. Not more than 20 mol % of the entire glycol component may be accounted for by some of the aforementioned glycols except ethylene glycol, aromatic diols such as hydroquinone, 2, 2-bis (4-hydroxyphenyl) propane, aliphatic diols including aromatics such as 1, 4-dihydroxy methylbenzene, polyalkylene glycols (polyoxyalkylene glycols) such as polyethylene glycol, polypropylene glycol and polytetramethylene glycol and the like. The polyesters of the present invention may further include those with not more than 20 mol % of the whole of dicarboxylic acid components and oxycarboxylic acid components accounted for by aromatic oxyacids such as hydroxybenzoic acid and oxycarbonic acid-derived components of aliphatic oxyacids such as ω-hydroxy capric acid copolymerized or bonded. Further, the polyesters of the present invention may include a quantity within a substantially linear range, for example, not more than 2 mol % of total acid, of copolymers of polycarboxylic acid or polyhydroxy compounds of 3-functional groups or more such as trimellitic acid and pentaerythritol. Further, the polyesters of the present invention may include, as necessary, additives such as pigments, dyes, ultraviolet absorbers, light stabilizers, antioxidants and light interceptors (such as carbon black and titanium dioxide).

Vaterite-type calcium carbonate included in the polyester composition of the present invention is that prepared by carbonating a calcium compound in a mixed medium of alcohol with water, and the polyester composition of the present invention is feasible only by the use of calcium carbonate of vaterite type prepared by this method.

Although calcium carbonate has as polymorphs calcite-type crystal of hexagonal system, aragonite-type crystal of rhombic system and vaterite-type crystal of pseudo-hexagonal system, but of all these, industrially manufactured and having a variety of uses are, for the most part, calcite-type crystal of cubic or spindle form and aragonite-type crystal of needle or columnar form. The vaterite-type calcium carbonate with its morphological feature is relatively good in dispersibility compared with the other two crystal types, hence, when they are used as pigments or fillers for paper, paints, rubber or plastics, marked improvement in coating and filling property can be hoped for, this resulting in improvement of general industrial products in physical strength, luster, whiteness and printing property.

From the above viewpoint, various methods have been studied for industrial manufacture of vaterite-type calcium carbonate. For instance, in Japanese Laid-open Patent '85/90822 disclosed is a method in which vaterite-type calcium carbonate is obtained by introducing a dioxide containing gas into an aqueous suspension of calcium hydroxide including magnesium compounds and adding condensed phosphoric acid alkali or its alkaline metal salt when a given degree of carbonation has been reached. Disclosed in Japanese Laid-open Patent '79/150397 is a method in which vaterite-type calcium carbonate is obtained by having ammonia coexist in advance for the slurry's pH to become 6.8 upon completion of reaction between calcium chloride and calcium hydrogen carbonate. Further, there is disclosed in Japanese Laid-open Patent '89/72916 an improvement of the method for manufacture of calcium carbonate through reaction of aqueous suspension of calcium hydroxide with carbon dioxide gas, in which vaterite-type calcium carbonate is obtainable by adding amino acid or its salt to the aforementioned suspension. Even if vaterite-type calcium carbonate obtained by some of these methods is incorporated into polyester, the object of the present invention cannot be attained. Supposing that vaterite-type calcium carbonate obtained by the known, conventional methods described above is extremely high in dispersibility, not containing coarse particles, and even if this vaterite-type calcium carbonate is incorporated into polyester to prepare a polyester composition such as polyester film, such vaterite-type calcium carbonate is insufficient in compatibility with polyester compared with vaterite-type calcium carbonate used in the present invention, separation takes place in the interface between particles of vaterite-type calcium carbonate and the polyester to give rise to voids, this resulting in damage of the polyester film and release of particles of calcium carbonate therefrom, which, in turn, causes chalking or drop-out in the case of films for magnetic tape et cetera, this interfering with securing a polyester composition of the present invention.

The reason for the fact that vaterite-type calcium carbonate has an extremely good compatibility with polyester compared with calcium carbonate of vaterite type, calcite type and aragonite type prepared by methods other than that of the present invention is not quite clear, but it is presumed that, since vaterite-type calcium carbonate included in the composition of the present invention is prepared by carbonation of a calcium compound in a mixed medium of alcohol with water, there exist lipophilic groups such as alkyl groups chemically bound with or very strongly adsorbed to the surface of calcium carbonate particles, which exhibit a sort of coupling effect.

The vaterite-type calcium carbonate used in connection with the present invention is prepared by carbonation of a calcium compound as material in a mixed medium of alcohol with water. As such calcium compounds may be included calcium oxide, calcium hydroxide, metallic calcium, hydrogenated calcium, calcium chloride, calcium iodide and calcium nitrate.

As alcohol used are monohydric, dihydric and trihydric alcohols not more than four in carbon number. Especially preferred are, among others, methyl alcohol, ethyl alcohol, propyl alcohol, butyl alcohol, ethylene glycol and glycerin. These can be used alone or in combination of two or more. The carbonation reaction for preparation of vaterite-type calcium carbonate used in connection with the present invention is carried out by the use of carbon dioxide or carbonates. The carbon dioxide used need not be gaseous and may as well be solid like dry ice. Also usable is a carbon dioxide-containing gas with $CO_2$ content of approximately 30 volume %, which is obtainable as a waste gas from calcination of limestone.

The vaterite-type calcium carbonate used in connection with the present invention has no particular limitation with regard to particle size and dispersibility, but vaterite-type calcium carbonate used in manufacture of polyester film is desired to satisfy all of the following requisites (a)–(e) for the distribution of projections in film surface to be sufficiently sharp.

(a) $0.1 \mu m \leq DS \leq 2.0 \mu m$
(b) $DP3/DS \leq 1.25$
(c) $1.0 \leq DP2/DP4 \leq 2.5$
(d) $1.0 \leq DP1/DP5 \leq 4.0$
(e) $(DP2-DP4)/DP3 \leq 1.0$ where:

DS is the mean particle size ($\mu m$) measured by the aid of a scanning-type electronic microscope (SEM) by first converting the primary particles into spheres identical in volume and then determining the mean diameter of such spheres;

DP1 is the particle size ($\mu m$) accounting for 10% by weight as measured from the larger particle size side in the particle size distribution determined by the use of a light-transmission-type particle size distribution measuring machine (SA-CP3 manufactured by Shimadzu Corp.);

DP2 is the particle size ($\mu m$) accounting for 25% by weight as measured from the larger particle size side in the particle size distribution determined by the aforementioned method;

DP3 is the particle size ($\mu m$) accounting for 50% by weight as measured from the larger particle size side in the particle size distribution determined by the aforementioned method;

DP4 is the particle size ($\mu m$) accounting for 75% by weight as measured from the larger particle size side in the particle size distribution determined by the aforementioned method; and DP5 is the particle size ($\mu m$) accounting for 90% by weight as measured from the larger particle size side in the particle size distribution determined by the aforementioned method.

A typical example of the method of manufacturing vaterite-type calcium carbonate satisfying all of the aforementioned requisites (a)–(e) is described below.

Figure 1:
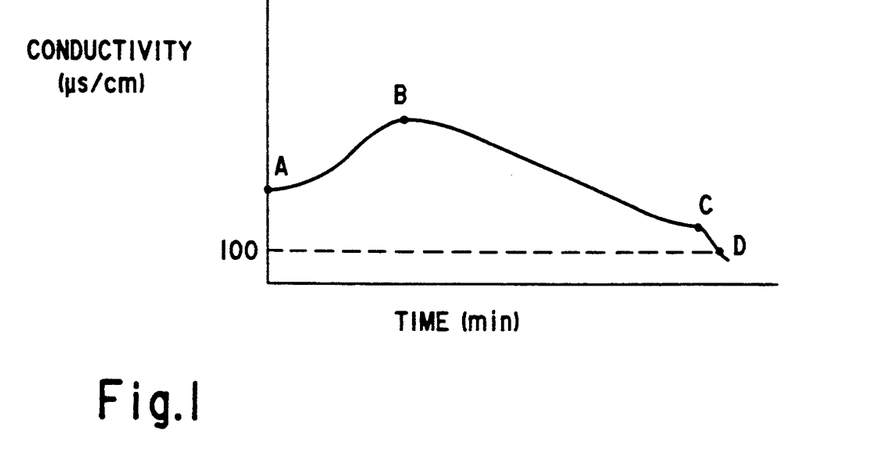
FIGS. 1 and 2 are graphs showing conductivity curves in the respective carbonation reaction system.

Water is added to methanol suspension of unslaked lime and/or slaked lime at a concentration of 0.5–12 weight % converted into unslaked lime in a quantity equivalent to 5–20 times mol of unslaked lime (in case of slaked lime, it is to be converted into unslaked lime of equal mol) and after preparation of a mixture of methanol, unslaked lime and/or slaked lime and water, carbon dioxide gas is let to pass through the aforementioned mixture for carbonation to proceed, the temperature in the carbonation reaction system is adjusted to not less than 30° C. before the conductivity in the system reaches the maximal point B in the conductivity curve shown in FIG. 1 and the time from the starting point A of the carbonation reaction to the point D in the same curve where the conductivity in the carbonation reaction system is 100 $\mu S/cm$ is less than 1,000 minutes.

When vaterite-type calcium carbonate used in connection with the present invention is used as polyester film or the like for use as the base film for, for example, 8 mm video tape and required to be very high in quality, it is still more preferably to satisfy all of the following requisites (f)–(j).

(f) $0.1 \mu m \leq DS \leq 2.0 \mu m$
(g) $DP3/DS \leq 1.25$
(h) $1.0 \leq DP2/DP4 \leq 1.4$
(i) $1.0 \leq DP1/DP5 \leq 2.5$
(j) $(DP2-DP4)/DP3 \leq 0.35$ the definitions of DS and DP1–DP5 being the same as described above.

A typical example of the method of manufacturing vaterite-type calcium carbonate satisfying all of the above requisites (f)–(j) is described below.

Figure 2:
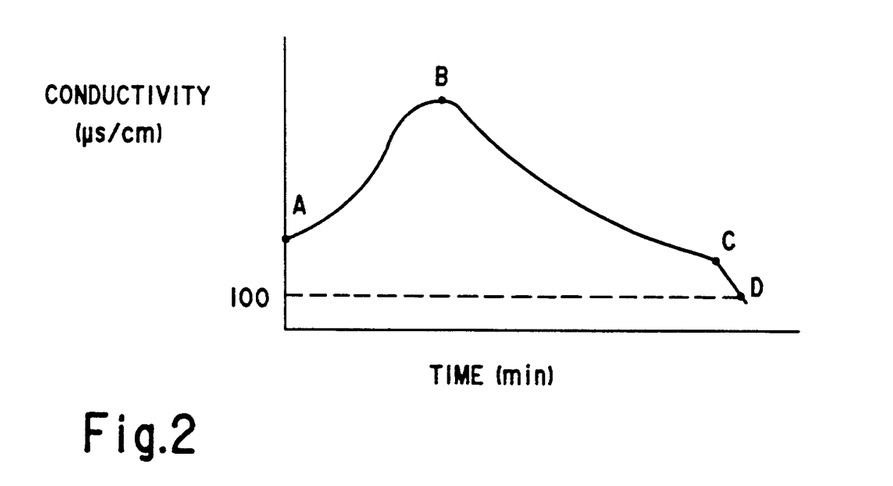

Water is added to methanol suspension of unslaked lime and/or slaked lime at a concentration of 0.5–12 weight % converted into unslaked lime in a quantity equivalent to 5–20 times mol of unslaked lime (in case of slaked lime, it is to be converted into unslaked lime of equal mol) and after preparation of a mixture of methanol, unslaked lime and/or slaked lime and water, carbon dioxide gas is let to pass through the aforementioned mixture for carbonation to proceed, the temperature in the carbonation reaction system is adjusted to not less than 30° C. before the conductivity in the system reaches the maximal point B in the conductivity curve shown in FIG. 2 and the time from the starting point A of the carbonation reaction to the point D in the same curve where the conductivity in the carbonation reaction system is 100 $\mu$S/cm is less than 120 minutes.

The vaterite-type calcium carbonate used in connection with the present invention may preferably be used after surface treatment in an ordinary manner with a surface treating agent such as carboxylic acid, phosphoric acid or polymers, salts or esters thereof and/or a dispersing agent such as a surfactant for further improvement in dispersibility, stability and the like.

According to the present invention, the content of vaterite-type calcium carbonate is preferably 0.005–10 weight % based on polyester and, more preferably, 0.01–5 weight %. When its content is less than 0.005 weight %, improvement attainable in slidability or antishaving property is insufficient, while, if it is in excess of 10 weight %, it is undesirable for the field of film, for example, because the surface roughness increases unduly and the anti-shaving property deteriorates.

It is also preferable according to the present invention to have vaterite-type calcium carbonate refined prior to incorporation into polyester for elimination of coarse particles. As classification means may be used, for example, wet or dry centrifugal separators and filters. More than one kind of these means may possibly be used in combination for stepwise refining.

Incorporation of vaterite-type calcium carbonate into polyester may be done in any stage of the process by any method arbitrarily but it is preferable to have it added in the form of glycol slurry before the start of polymerization in polyester reaction and, especially before completion of ester exchange or esterifcication reaction.

The glycol slurry of vaterite-type calcium carbonate used in connection with the present invention can be easily prepared by pouring glycol such as ethylene glycol into a mixture of alcohol, water and vaterite-type calcium carbonate having carbonated and flushing thereafter. The aforementioned polyester can be used as a polyester composition as it is or diluted with some other kind of polyester (not containing vaterite-type calcium carbonate at not less than a predetermined proportion). As other kinds of polyester used for dilution may be included, for example, polyester compositions manufactured by the conventional inner particles separation method or outer particles adding method or polyester not containing particles. Any way, the final polyester compositions are required to contain not less than the aforementioned proportion of vaterite-type calcium carbonate.

The polyester compositions, polyester films in particular, of the present invention have such advantages as being flat in the surface and also being good in wear resistance compared with the conventional polyester films, hence they are useful in many ways, especially in the field of magnetic tape which is required to have a high wear resistance.

The present invention will hereinafter described more specifically with reference to examples and comparative examples but it is to be understood that the invention is by no means limited thereby.

Measurement of the individual characteristic values was made by the following method.

(1) Particle size distribution

Measuring instrument: Shimadzu Corp.'s SA-CP3

Measuring method:

Solvent: 0.004 weight % aqueous solution of sodium polyacrylate prepared by dissolving it in deionized water Preparatory dispersion: Ultrasonic dispersion for 100 seconds Measuring temperature: 25.0° C. +2.5° C.

Calculation method: As shown by the following calculation example

| Result measured of particle size distribution ||
| Particle size ($\mu$m) | Cumulative weight (%) |
| --- | --- |
| 8.00~6.00 | 0.0 |
| 8.00~5.00 | 1.0 |
| 8.00~4.00 | 3.0 |
| 8.00~3.00 | 6.0 |
| 8.00~2.00 | 11.0 |
| 8.00~1.00 | 18.0 |
| 8.00~0.80 | 28.0 |
| 8.00~0.60 | 42.0 |
| 8.00~0.50 | 58.0 |
| 8.00~0.40 | 72.0 |
| 8.00~0.30 | 82.0 |
| 8.00~0.20 | 89.0 |
| 8.00~0.15 | 94.0 |
| 8.00~0.10 | 97.0 |
| 8.00~0.08 | 99.0 |
| 8.00~0.06 | 100.0 |
| 8.00~0.00 | 100.0 |

The values DP1, 2, 3, 4 and 5 calculated on the basis of the above result of the measurement of particle size distribution are as follows:

$$DP1 = 2.00 + (11.0 - 10.0) \times (3.00 - 2.00) \div (11.0 - 6.0) = 2.20$$

$$DP2 = 0.80 + (28.0 - 25.0) \times (1.00 - 0.80) \div (28.0 - 18.0) = 0.86$$

$$DP3 = 0.50 + (58.0 - 50.0) \times (0.60 - 0.50) \div (58.0 - 42.0) = 0.55$$

$$DP4 = 0.30 + (82.0 - 75.0) \times (0.40 - 0.30) \div (82.0 - 72.0) = 0.37$$

$$DP5 = 0.15 + (94.0 - 90.0) \times (0.20 - 0.15) \div (94.0 - 89.0) = 0.19$$

(2) Particle size:

Observation was made by the use of Hitachi, Ltd's scanning-type electronic microscope at a magnification rate of 20,000.

(3) Measurement of conductivity:

Measurement was taken by the use of Toa Denpa Kogyo's Conductometer CM-40S with 25° C. as reference temperature.

(4) Measurement of pH value:

Yokogawa Electric Corp's Personal pH meter "pH81-11-J" was used.

(5) Film's surface roughness (Ra):

This is a value defined by JIS-B0601 as center line average roughness (Ra) and in this invention it is measured by the use of Kosaka Laboratory, Ltd.'s tracer type surface roughness meter (Surfcorder SF-30C), the measuring conditions being as follows.

(a) Tracer tip radius: 2 μm
(b) Measuring pressure: 30 mg
(c) Cut-off: 0.25 mm
(d) Measuring length: 0.5 mm
(e) Measurement is repeated 5 times, the largest of the measured values is eliminated and the mean is taken of the remaining 4 values.

(6) Film's friction coefficient (μk)

Figure 3:
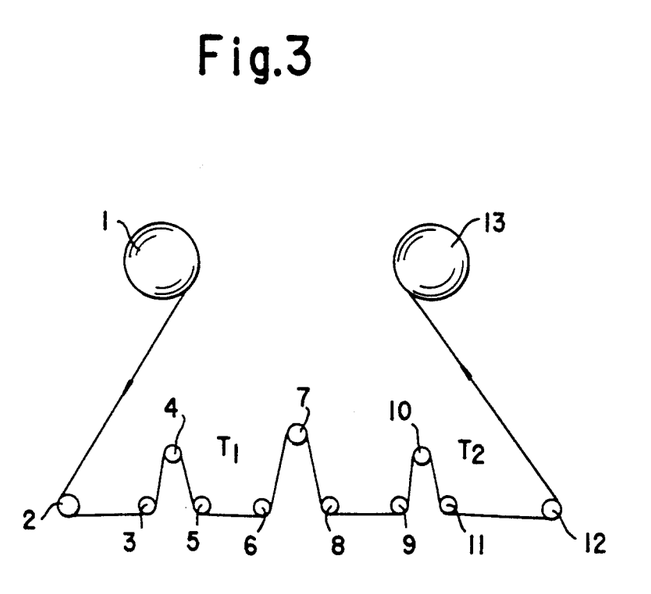
FIG. 3 is a sketch showing the instrument for measurement of film's dynamic friction coefficient (μk).

This coefficient is measured in the following way using the instrument shown in FIG. 3. In the figure (1) is a pay-out reel, (2) a tension controller, (3), (5), (6), (8), (9) and (11) free rollers, (4) a tension detector (inlet), (7) a fixed bar of stainless steel SUS304 (5 mm in outer diameter), (10) a tension detector (outlet), (12) a guide roller and (13) a winding reel.

Film slit into strips ½" wide and the surface of film strip is brought into contact with the fixed bar (7) (surface roughness 0.3 μm) at an angle of $\theta=(152/180)\pi$ radian (152°) in an atmosphere of 20° C. and 60% in humidity and is caused to move in contact at a speed of 200 cm/minute for friction to take place. After running of the film by 90 m, the tension at the outlet ($T_2$:g) is measured with the tension at the inlet adjusted to 35 g by the controller and the running friction coefficient μk is calculated by the following formula.

$$k = (2.303/\theta) \log (T_2/T_1)$$
$$= 0.86 \log (T_2/35)$$

(7) Wear resistance appraisal - I

The surface of film strip ½" wide is brought into contact with the surface of a stainless steel fixed pin (surface roughness 0.58) at an angle of 150° and the film is moved reciprocatively over a stroke of approximately 15 cm at a speed of 2 m/minute for friction to take place (with the inlet-side tension $T_1$ adjusted to 60 g).

After 40 reciprocal cycles under the above conditions the degree of the resulting scratches is evaluated visually against the following scale.

◉: Scratching is scarcely noticeable.
: A few scratches are noted.
Δ: A large number of scratches are noted.
X: Scratches are noted all over.

(8) Wear resistance appraisal - II

The anti-shaving property of a film's running surface is evaluated by the use of a 5-stage mini-super calender. The calender used is a 5-stage calender comprising nylon rolls and steel rolls, and the test was made at a treating temperature of 80° C., a linear pressure of 200 kg/cm and a film running speed of 50 m/minute. After frictional running of 4,000 m of the film, the film's anti-shaving property is evaluated by the degree of smear of the calender's top roller according to the following standard.

◉: Nylon roller showing no indication of smear.
: Smear of nylon roller scarcely noticeable.
X: Smear of nylon roller noticeable.
XX: Marked smear of nylon roller noticeable.

(9) Number of large projections on film surface

After providing thin deposition of aluminum on a film's surface, the number of projections larger than quadruple rings in film surface (per $mm^2$ measured area) is counted by the use of a two-flux interference-type microscope and ranking is made according to the following classification standard.

| Class 1: 16 or more | Class 2: 12–15 |
| Class 3: 8–11 | Class 4: 4–7 |
| Class 5: 0–3 | |

Then, the methods of preparing calcium carbonate and synthetic spherical silica used in the Examples and Comparative Examples are described below.

Calcium Carbonate A

Granular unslaked lime (special grade reagent) with an activity of 82 was ground in a dry grinder (Colloplex, made by Alpine Co.), the ground unslaked lime was thrown into methanol and after sifting off coarse particles through a 200 mesh sieve, a methanol suspension of unslaked lime with an unslaked lime solid concentration of 20% was prepared. The methanol suspension so obtained was cracked by a wet grinder (Dainomill Pilot Type, made by WAB Co.) and a dispersed methanol suspension of unslaked lime was prepared.

To this dispersed methanol suspension of unslaked lime, methanol was further added for dilution thereof to an unslaked lime concentration of 3.0 weight %, and then 11 times equivalent mols of water with respect to unslaked lime was added to prepare a mixture of methanol, unslaked lime and water. This mixture containing 200 g of unslaked lime was then heated to 42° C. and then carbon dioxide gas was let to pass through the mixture at a rate of 0.082 mol/min. per mol of unslaked lime for carbonation to proceed. The reaction conditions were so adjusted that 5 minutes after the start of carbonation reaction the conductivity in the system reaches the maximal point (corresponding to the point B in FIG. 1) with simultaneous rise of temperature in the system to 45° C. The carbonation reaction was further continued until the conductivity in the system reached 100 μS/cm, 19 minutes later and at this point (corresponding to the point D in FIG. 1) supply of carbon dioxide gas was stopped and the carbonation reaction was terminated thereby. The pH in the system was 7.0 when the point D was reached.

The calcium carbonate A thus obtained turned out to be 100% vaterite-type calcium carbonate as it was examined by X-ray diffraction measuring method.

To the mixture of methanol, water and the calcium carbonate A thus obtained, 1.5 weight % with respect to the calcium carbonate A of a surface treating agent (a copolymer of acrylic acid and butyl methacrylate 70:30 by weight ratio, 20% of entire carboxyl groups in the acrylic acid portion accounted for by ammonium salts) was added for surface treatment under stirring and then ethylene glycol was further added to prepare a mixture of methanol, water and the calcium carbonate A. This mixture was then flushed by means of a rotary evaporator for elimination of methanol and water therefrom and ethylene glycol slurry, 0.5 weight % in content of residual water and 20.0 weight % in solid concentration of the calcium carbonate A was thus obtained.

The physical properties of the calcium carbonate A in ethylene glycol are shown in Table 1. The data in Table 1 substantiate that the calcium carbonate A is vaterite-type calcium carbonate almost free of secondary agglomerates and excellent in dispersibility.

Calcium Carbonate B

To a dispersion of methanol suspension of unslaked lime, same as one used in preparation of the calcium carbonate A, methanol was further added to adjust the unslaked lime concentration to 3.8 weight % and 8 times mols of water with respect to methanol lime was added to prepare a mixture of methanol, unslaked lime and water. After adjusting the temperature of the mixture containing 200 g of unslaked lime to 37° C., carbon dioxide gas was let to pass through the mixture at a rate of 0.026 mol/minute per mol of unslaked lime under stirring for carbonation reaction to proceed. It was so adjusted that the conductivity in the system reaches the maximal point (equivalent to the point B in FIG. 1) 10 minutes after the start of carbonation reaction and at this maximal point the system temperature reaches 40° C. The carbonation reaction was further continued and supply of carbon dioxide gas was stopped 40 minutes after the start of the carbonation reaction when the conductivity in the system reached 100 $\mu$S/cm (equivalent to the point D in FIG. 1) to stop the carbonation reaction. At the point D the system pH was 7.0.

The calcium carbonate B thus obtained was confirmed to be 100% vaterite-type calcium carbonate by X-ray diffraction measurement method.

Thereafter, this calcium carbonate B was surface-treated and flushed in the same manner as the calcium carbonate A, and an ethylene glycol slurry, 0.4 weight % in content of residual water and 20.0 weight % in solid concentration of the calcium carbonate B was obtained.

The physical properties of the calcium carbonate B in the ethylene glycol slurry are shown in Table 1. The data in Table 1 substantiate that the calcium carbonate B is vaterite-type calcium carbonate almost free of secondary agglomerates and excellent in dispersibility.

Calcium Carbonate C

To a dispersion of methanol suspension of unslaked lime, same as one used in preparation of the calcium carbonate A, methanol was further added to adjust the unslaked lime concentration to 3.0 weight % and 11 times mols of water with respect to methanol lime was added to prepare a mixture of methanol, unslaked lime and water. After adjusting the temperature of the mixture containing 200 g of unslaked lime to 42° C., carbon dioxide gas was let to pass through the mixture at a rate of 0.0022 mol/minute per mol of unslaked lime under stirring for carbonation reaction to proceed. It was so adjusted that the conductivity in the system reaches the maximal point (equivalent to the point B in FIG. 1) 10 minutes after the start of carbonation reaction and at this maximal point the system temperature reaches 45° C. The carbonation reaction was further continued and supply of carbon dioxide gas was stopped 450 minutes after the start of the carbonation reaction when the conductivity in the system reached 100 $\mu$S/cm (equivalent to the point D in FIG. 1) to stop the carbonation reaction. At the point D the system pH was 6.8.

The calcium carbonate C thus obtained was confirmed to be 100% vaterite-type calcium carbonate by the X-ray diffraction measurement method.

Thereafter, this calcium carbonate C was surface-treated and flushed in the same manner as the calcium carbonate A, and an ethylene glycol slurry, 0.5 weight % in content of residual water and 20.0 weight % in solid concentration of the calcium carbonate C was obtained.

The physical properties of the calcium carbonate C in the ethylene glycol slurry are shown in Table 1. The data in Table 1 substantiate that the calcium carbonate C is vaterite-type calcium carbonate almost free of secondary agglomerates and excellent in dispersibility.

Calcium Carbonate D

Milk of lime prepared by addition of water to unslaked lime had its specific gravity and temperature adjusted to 1.070 and 10° C. respectively, furnace gas with a carbon dioxide gas concentration of 25 weight % was let to pass through the milk of lime so prepared at a rate of 20 m$^3$/minute for carbonation reaction to proceed, and this reaction was terminated when the system pH reached 6.5. The temperature of the aqueous suspension of calcium carbonate after completion of the carbonation reaction was adjusted to 50° C. and stirring was continued for 24 hours. Calcium carbonate thus prepared was of calcite type and the primary particle size determined by means of scanning-type electronic microscopic photography was 0.2 $\mu$m. This aqueous suspension of calcium carbonate was dehydrated in an ordinary manner, 1.5 weight % with respect to the solid content of calcium carbonate of sodium polyacrylate was added to the dehydrated cake and an aqueous slurry of calcium carbonate, 35 weight % in solid concentration was obtained. The aqueous slurry thus obtained wet ground by passing it 10 times at a flow rate of 60 cc/minute through a wet grinder (Dainomill Pilot Type, made by WAB Co., media charge 80%, 0.6–0.9 mm in media size, 1,500 rpm.) for dispersion of agglomerates.

Then, the aforementioned surface treating agent and ethylene glycol were added to the mixture of water and the calcium carbonate D prepared by the aforementioned method, surface treatment and flushing were carried out in the same manner as in the case of the calcium carbonate A and an ethylene glycol slurry, 0.7 weight % in content of residual water and 20.0 weight % in solid content of the calcium carbonate D was obtained.

The physical properties of the calcium carbonate D in the aforementioned ethylene glycol slurry are shown in Table 1. The data in Table 1 substantiate that, despite the repeated intensive wet-grinding it has undergone, the calcium carbonate D is broad in particle size distribution and ununiform in the shape of particles.

Calcium Carbonate E

In milk of lime with a specific gravity of 1.035 prepared by adding water to unslaked lime, glycine and glutamic acid (both being amino acids) were dissolved in a quantity of 20 weight % each with respect to calcium hydroxide and after adjustment of the temperature of the milk of lime to 20° C. carbon dioxide gas was let to pass through the milk of lime at the rate of 0.822 liter/minute per mol of calcium hydroxide in the milk of lime for carbonization reaction to proceed and the reaction was terminated when the system pH reached 6.5. The calcium carbonate E so prepared was confirmed to be 100% vaterite-type calcium carbonate by the X-ray diffraction measurement.

Ethylene glycol was poured into the mixture of water and the calcium carbonate E so prepared for flushing in the same manner as in case of the calcium carbonate A and an ethylene glycol slurry, 0.3 weight % in content of residual water and 20.0 weight % in solid concentration of the calcium carbonate E was obtained.

The physical properties of the calcium carbonate E in the aforementioned ethylene glycol slurry are shown in Table 1.

Synthetic Spherical Silica A 0.006 g of NAOH was dissolved in 81.0 g of water, 2.3 g of silica sol and 100 g of ethanol were added to the solution, the mixture was stirred and its temperature was kept at 35° C. Then, with the pH of the mixture controlled at 11.5 through addition of ammonia gas at a proper rate, the mixture of 600 g of ethanol and 540 g of water, and also 320 g of 28% ethyl silicate were both added slowly over 16 hours. The particles thus formed were confirmed by the scanning-type electronic microscope photography to be spherical silica, 0.2 μm in particle size or diameter.

Then, ethylene glycol was poured into the mixture of the spherical silica, ethanol and water obtained by the aforementioned method, water and ethanol were removed by subsequent flushing by the use of a rotary evaporator and an ethylene glycol slurry, 0.8% in content of residual water and 20.0 weight % in the solid concentration of spherical silica was obtained.

Example 1

Polyesterification reaction was carried out with ethylene glycol slurry of the calcium carbonate A added prior to the start of the reaction and polyethylene telephthalate of intrinsic viscosity of 0.62 dl/g (ortho-chlorophenol, 35° C.) containing 0.3 weight % of the calcium carbonate A. After drying at 160° C. the polyethylene telephthalate was melt extruded at 290° C. after drying at 160° C. onto the surface of a casting drum whose temperature was kept at 40° C. to be quenched and solidified thereon as a sheet of unstretched film. Then, the unstretched film was preheated to 70° C. by a heating roller and was stretched 3.6 times lengthwise under heating by an infrared heater. Thereafter, the film was stretched laterally 4.0 times at 90° C. and after subsequent heat treatment at 200° C., a biaxially oriented film, 15 μm thick was thus obtained.

The physical properties of the biaxially oriented film so obtained are shown in Table 2, and as seen from the tabulated data, the film is low in friction coefficient, low in the count of coarse particles and good in wear resistance.

Examples 2 and 3

Biaxially oriented films, 15 μm thick were prepared in the same manner as described in Example 1 except that the calcium carbonate A used in Example 1 was substituted by the calcium carbonate B and C respectively.

As seen from Table 2, in which the properties of these biaxially oriented films are shown, both films were low in friction coefficient, low in the count of coarse particles and good in wear resistance.

Comparative examples 1–3

Biaxially oriented films, 15 μm thick were prepared in the same manner as described in Example 1 except that the calcium carbonate A used in Example 1 was substituted by the calcium carbonate D, the calcium carbonate E and the spherical silica A.

As seen from Table 2, in which the properties of these biaxially oriented films are shown, the three films were all inferior in properties.

TABLE 1

|   | Calcium carbonate A | Calcium carbonate B | Calcium carbonate C | Calcium carbonate D | Calcium carbonate E | Synthetic spherical silica A |
|---|---|---|---|---|---|---|
| DS | 0.20 | 0.50 | 0.22 | 0.21 | 0.52 | 0.20 |
| DP 1 | 0.252 | 0.490 | 0.440 | 0.481 | 2.331 | 0.198 |
| DP 2 | 0.196 | 0.480 | 0.330 | 0.396 | 1.361 | 0.187 |
| DP 3 | 0.178 | 0.446 | 0.240 | 0.317 | 0.830 | 0.168 |
| DP 4 | 0.162 | 0.414 | 0.194 | 0.240 | 0.526 | 0.147 |
| DP 5 | 0.146 | 0.353 | 0.163 | 0.203 | 0.241 | 0.118 |
| DP 3/DS | 0.89 | 0.89 | 1.10 | 1.51 | 1.60 | 0.84 |
| DP 2/DP 4 | 1.21 | 1.16 | 1.70 | 1.65 | 2.59 | 1.27 |
| DP 1/DP 5 | 1.73 | 1.39 | 2.70 | 2.38 | 9.67 | 1.68 |
| (DP2-DP4)/DP3 | 0.19 | 0.15 | 0.56 | 0.49 | 1.01 | 0.24 |

TABLE 2

| Example. Comp. Example No. | Example 1 | Example 2 | Example 3 | Comp. Example 1 | Comp. Example 2 | Comp. Example 3 |
|---|---|---|---|---|---|---|
| Roughness Ra μm | 0.014 | 0.017 | 0.012 | 0.016 | 0.019 | 0.013 |
| Friction coefficient μk | 0.18 | 0.14 | 0.17 | 0.19 | 0.16 | 0.18 |
| Wear resistance appraisal - I | ⊚ | ⊚ | ⊚ | ○ | X | Δ |
| Wear resistance appraisal - II | ⊚ | ⊚ | ○ | X | XX | X |
| Number of large projections | Class 5 | Class 5 | Class 4 | Class 3 | Class 1 | Class 4 |

According to the present invention, as described above, polyester compositions excelled in slidability and wear resistance and also less in the count of large projections are obtainable.

What is claimed is:

1. A polyester composition comprising a saturated polyester and 0.005–10 weight %, based on the polyester, of a particulate vaterite-type calcium carbonate having the following particle size and particle size distribution:

0.1 μm ≦ DS ≦ 2.0 μm
DP3/DS ≦ 1.25

$1.0 \leq DP2/DP4 \leq 2.5$
$1.0 \leq DP1/DP5 \leq 4.0$
$(DP2-DP4)/DP3 \leq 1.0$
wherein
  DS is the mean particle size in μm,
  DP1 is the particle size in μm for 10% by weight,
  DP2 is the particle size in μm for 25% by weight,
  DP3 is the particle size in μm for 50% by weight,
  DP4 is the particle size in μm for 75% by weight of the particles, and
  DP5 is the particle size in μm for 90% by weight of the particles, said particulate vaterite-type calcium carbonate having been prepared by the carbonation of a calcium compound in a mixed alcohol and water medium.

2. The polyester composition according to claim 1, having the following particle size and particle size distribution:
  $0.1\ \mu m \leq DS \leq 2.0\ \mu m$
  $DP3/DS \leq 1.25$
  $1.0 \leq DP2/DP4 \leq 1.4$
  $1.0 \leq DP1/DP5 \leq 2.5$
  $(DP2-DP4)/DP3 \leq 0.35$.

* * * * *